(12) United States Patent
Mannari et al.

(10) Patent No.: US 12,729,078 B2
(45) Date of Patent: Sep. 8, 2026

(54) CONTAINER HANDLING SYSTEM

(71) Applicant: Konecranes Global Corporation, Hyvinkää (FI)

(72) Inventors: Ville Mannari, Hyvinkää (FI); Ilkka Leppänen, Hyvinkää (FI); Tero Jaakkola, Hyvinkää (FI)

(73) Assignee: KONECRANES GLOBAL CORPORATION, Hyvinkää (FI)

( * ) Notice: Subject to any disclaimer, the term of this patent is extended or adjusted under 35 U.S.C. 154(b) by 0 days.

(21) Appl. No.: 18/871,374

(22) PCT Filed: Jun. 5, 2023

(86) PCT No.: PCT/FI2023/050322
§ 371 (c)(1),
(2) Date: Dec. 3, 2024

(87) PCT Pub. No.: WO2023/237814
PCT Pub. Date: Dec. 14, 2023

(65) Prior Publication Data

US 2025/0263253 A1 Aug. 21, 2025

(30) Foreign Application Priority Data

Jun. 6, 2022 (FI) ..................................... 20225494

(51) Int. Cl.
*B65G 63/00* (2006.01)

(52) U.S. Cl.
CPC ........ *B65G 63/004* (2013.01); *B65G 2207/40* (2013.01)

(58) Field of Classification Search
CPC .. B65G 2207/40; B65G 63/004; B65G 63/00; E04G 21/3209
See application file for complete search history.

(56) References Cited

U.S. PATENT DOCUMENTS 6,554,557 B1 4/2003 Takehara et al.
6,698,990 B1 * 3/2004 Dobner ................ B65G 63/004 414/139.9
9,630,557 B2 4/2017 Hoepner et al.
2006/0251498 A1 11/2006 Buzzoni et al.
(Continued)

FOREIGN PATENT DOCUMENTS

AU 2014 203 318 B2 12/2018
CN 101824926 A 9/2010
(Continued)

OTHER PUBLICATIONS

Written Opinon of the International Searching Authority; PCT/FI2023/050322 dated Aug. 8, 2023.
(Continued)

*Primary Examiner* — Kaitlin S Joerger
(74) *Attorney, Agent, or Firm* — Birch, Stewart, Kolasch & Birch, LLP

(57) ABSTRACT

A container handling system, comprising a container crane configured to move a container between a container yard and a loading/unloading zone, the loading/unloading zone is configured to receive a transport vehicle for transporting the container. The loading/unloading zone further comprises a protective structure configured to cover a predetermined section of the loading/unloading zone.

19 Claims, 5 Drawing Sheets

(56) References Cited

U.S. PATENT DOCUMENTS

| | | | | |
|---|---|---|---|---|
| 2010/0192486 | A1* | 8/2010 | Khoon | B65G 63/004 52/173.1 |
| 2015/0112476 | A1* | 4/2015 | Torson | G06Q 10/047 700/214 |
| 2020/0104790 | A1* | 4/2020 | Chung | H04W 4/029 |
| 2020/0125074 | A1* | 4/2020 | Ramos | G05B 19/4155 |
| 2021/0316953 | A1* | 10/2021 | Schweizer | B65G 67/603 |

FOREIGN PATENT DOCUMENTS

| | | | | | |
|---|---|---|---|---|---|
| CN | 107816215 | A | * | 3/2018 | E04G 21/3209 |
| CN | 114084693 | A | * | 2/2022 | B65G 65/30 |
| CN | 114170252 | A | | 3/2022 | |
| EP | 2 213 596 | A1 | | 8/2010 | |
| JP | S52121275 | A | | 10/1977 | |
| JP | 2006504595 | A | * | 2/2006 | B66C 13/46 |
| KR | 101804947 | B1 | | 12/2017 | |
| WO | 2020059842 | A1 | | 3/2020 | |
| WO | 2021175403 | A1 | | 9/2021 | |

OTHER PUBLICATIONS

Chinese Office action dated Mar. 31, 2025 for application No. 202380052092.5.

* cited by examiner

CONTAINER HANDLING SYSTEM

TECHNICAL FIELD

The present invention relates to a container handling system and particularly to loading/unloading containers with a crane.

BACKGROUND

Containers are used in land and sea transport between countries and continents. Container dimensions are standardized, whereby it is easier to handle them by various vehicles. In ports, containers are handled by cranes, such as gantry cranes. Within a port area, containers are moved from one place to another or from one vehicle to another, for example from a port area to a transport vehicle used in internal or external traffic of the port area. Transport vehicles used in internal and external traffic of a port area include trucks and terminal tractors, for instance.

A typical container crane used for picking up and stacking containers is called a gantry crane, which may move either on rails (RMG, Rail Mounted Gantry Crane) or on rubber tyres (RTG, Rubber Tyred Gantry Crane). When a gantry crane is used, containers are handled between the legs of the gantry crane. Typically, a driveway is left between the legs of the gantry crane to enable containers to be driven along it underneath the gantry crane to be stacked into rows or to be moved to another vehicle. Another type of rail mounted gantry crane is Automated Stacking Crane (ASC), which allow a faster and continuous stacking, repositioning, and retrieval of containers because of automation. For example, U.S. Pat. No. 6,698,990 B1 discloses a stacking crane suitable for port terminal.

However, due to safety requirements, drivers of the transport vehicles are not allowed to stay inside the cabins of the transport vehicles during the loading/unloading operations and usually must exit the cabin and leave the loading/unloading zone to a safe zone which is some distance away from the loading/unloading zone.

This has an effect to the transport vehicle turnaround time. Leaving the loading/unloading zone and returning to the cabin adds more time to the overall loading/unloading operations as the container crane is not allowed to operate until the driver has reached the safe zone. This safety measure is usually supervised by a separate actuator such as a pressure mat, for example. It can also be a locked or marked station with sensors or camera to detect that the driver is present in the designated area.

BRIEF DESCRIPTION

An object of the present invention is to provide a better safety solution and reduce operations time to alleviate the above problems. The independent claim defines a container handling system, which is characterized by what is disclosed in the independent claims. Preferred embodiments of the invention are disclosed in the dependent claims and the detailed description.

The invention is based on the idea of utilizing a protective structure in the loading/unloading zone.

BRIEF DESCRIPTION OF THE DRAWINGS

In the following the invention will be described in greater detail by means of preferred embodiments with reference to the attached drawings, in which.

DETAILED DESCRIPTION

Figure 1:
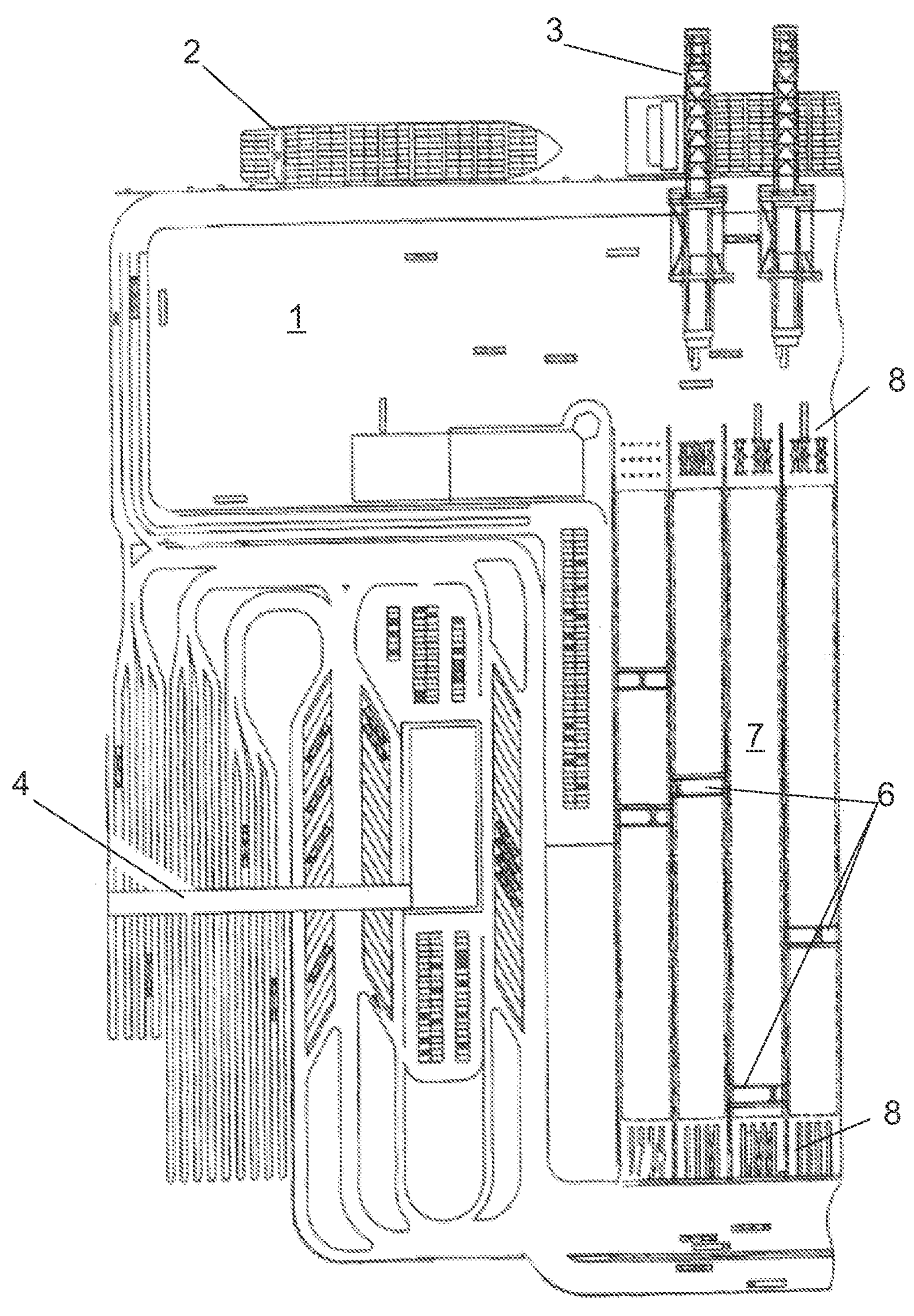
FIG. 1 shows an overview of a port area.

FIG. 1 shows an exemplary overview of a port area, which includes a container terminal area 1, where containers are moved from or to a cargo ship 2 via a ship-to-shore (STS) cranes 3. The container terminal area 1 is typically fenced and locked with high security measures. For trucks or other vehicles to enter the container terminal area 1, an identification zone 4 is needed.

The present invention pertains to a container handling system when handling containers 5 at a waterside or a landside. During the waterside operations the containers are transported from the STS crane 3 to the container yard 7, or vice versa, using terminal tractors, for example. During the landside operations the containers are transported from the container yard 8 to outside the port area, or vice versa, using trucks, for example, which can have varying lengths. The container handling system comprises a container crane 6 configured to move a container 5 between a container yard 7 and a loading/unloading zone 8. The loading/unloading zone 8 in this context can refer to either a loading/unloading zone for waterside operations or a loading/unloading zone for landside operations or both. The container crane 6 can lift a container 5 from the container yard 7 to the loading/unloading zone 8, and vice versa.

The container 5 is a box-like transport unit having standard dimensions. A typical container is about 2.43 metres (8 feet) wide and 6.06 metres (20 feet) or 12.2 metres (40 feet) long and 2.59 metres (8.5 feet) or 2.89 metres (9.5 feet) tall.

The containers 5 are provided with standardized corner castings enabling a container 5 to be lifted and carried by different container cranes. A container crane 6 is typically provided with a spreader suspended on hoisting ropes or chains, wherein the spreader is adjusted by a telescopic mechanism according to the length of the container to be picked up. The container crane 6 can be a gantry crane movable on either rails (RMG) or on rubber tyres (RTG). It can also be an end-feed type ASC.

The container yard 7 is typically a long storage area where the containers 5 are stacked and stored. Often, the container yard 7 is in a terminal or dry port and used for aligning containers 5 for loading on a ship 2 and for storing off-loaded containers till they are transported elsewhere. The layout is usually in a block layout where up to five containers 5 on top of each other are called a block. This enables a large number of containers to be stored within a small area, such as in a container port.

The loading/unloading zones 8 are typically at ends of the container yard 7 and configured to receive a transport vehicle 9 for transporting the container 5. The transport vehicle in this context can refer to any vehicle suitable for transporting a container or containers. The loading/unloading zone 8 can have a plurality of parking lanes 80 for transport vehicles 9 to park. The designated parking lane 80 depends on where the container is retrieved from or deposited to. The loading/unloading zone 8 at the waterside is typically for terminal tractors which stay inside the port area (internal traffic), and the loading/unloading zone 8 at the landside is typically for trucks arriving from outside port area (external traffic).

Figure 2:
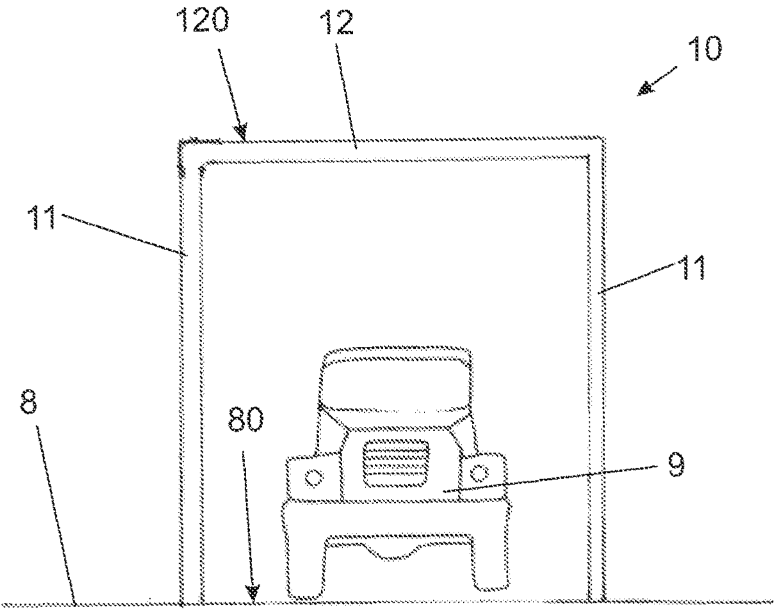
FIG. 2 shows a front view of a protective structure according to an embodiment.

FIG. 2 shows a front view of a protective structure according to an embodiment when viewing one parking lane 80 of the loading/unloading zone 8 where the transport vehicle 9 is parked. In the embodiment illustrated in FIG. 2, the loading/unloading zone 8 further comprises a protective structure 10 configured to cover a predetermined section of the loading/unloading zone 8. The purpose of the protective structure 10 is to protect the driver from falling or swaying containers 5 during loading/unloading process. The protective structure 10 can be fixed to the ground in a sturdy and supportive manner, for instance with fasteners, so that it can stay stable even if heavy load falls on it or hits it from a side. However, in some embodiments, the protective structure 10 can be movable and secure with rails or toothed guide or having mounting holes, which may be helpful when dealing with containers or vehicles of different lengths.

The protective structure 10 can comprise two sides 11, possibly parallel with each other, and supporting a top 12 between them so that the transport vehicle 9 can pass between the two sides 11 and under the top 12. The protective structure 10 can be upside-down U-shaped when viewing from an end of the parking lane 80. Each side 11 can comprise a pillar or/and a wall which is connected to the top 12, for instance with fasteners, welding, or other known methods. The pillar can be a metal bar or concrete pillar, for example. The wall can be made of steel or concrete or concrete with reinforced steel bars within, for example. However, other suitable material or material combinations can be used to obtain a strong and robust structure. In some embodiments, the top 12 can be supported with only one pillar or one wall. In yet another embodiment, the sides 11 and the top 12 can be one integrated part, such as an arc.

The top 12 can comprise a flat roof 120 which can be made of impermeable material such as a strong steel plate. The steel plate can be for example 20-120 mm thick, particularly 40-80 mm thick. The top 12 can also or alternatively comprise metal grids or reinforcements, for example, to better absorb shock impact forces.

Figure 3:
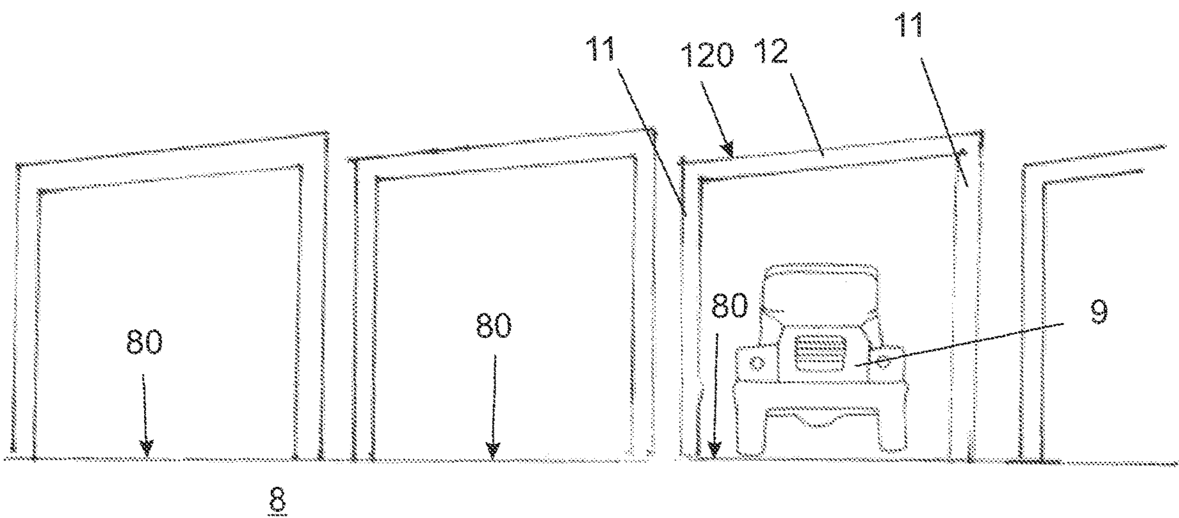
FIG. 3 shows a front view of a protective structure according to another embodiment.

FIG. 3 shows a front view of a protective structure 10 according to another embodiment, wherein the roof 120 can be at least partially inclined (monopitched roof) having a slope for guiding rainwater. The slope of the roof 120 can vary from 1-15 degrees, and particularly 1-10 degrees. The roof 120 can also be at least partially curved shape.

The rainwater can be guided towards one side of a longitudinal border of the parking lane 80, such as shown in FIG. 3, or both sides for example with a gable roof, or front of the cabin. Guiding the rainwater towards the back of the cabin may cause interference of possible sensor activity. However, depending on the location of the sensor, guiding the rainwater towards the back of the cabin can also be possible.

As illustrated in FIG. 3, each parking lane 80 of the loading/unloading zone 8 can have one protective structure. However, in some embodiments, one united protective structure 10 can cover more than one parking lanes 80.

Figure 4:
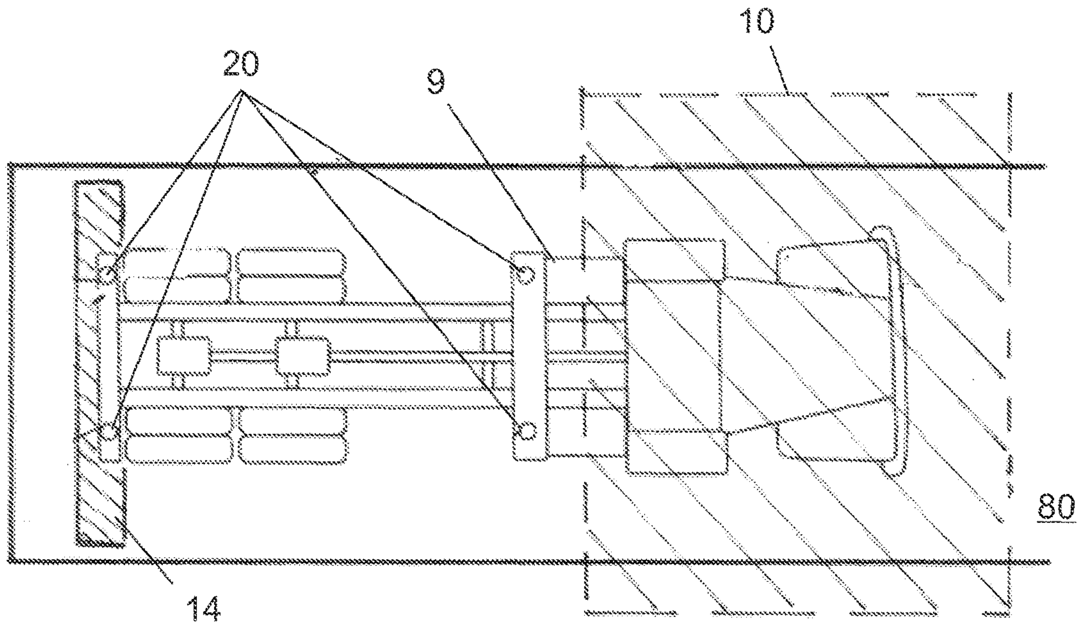
FIG. 4 shows a top view of the protective structure.
Figure 5:
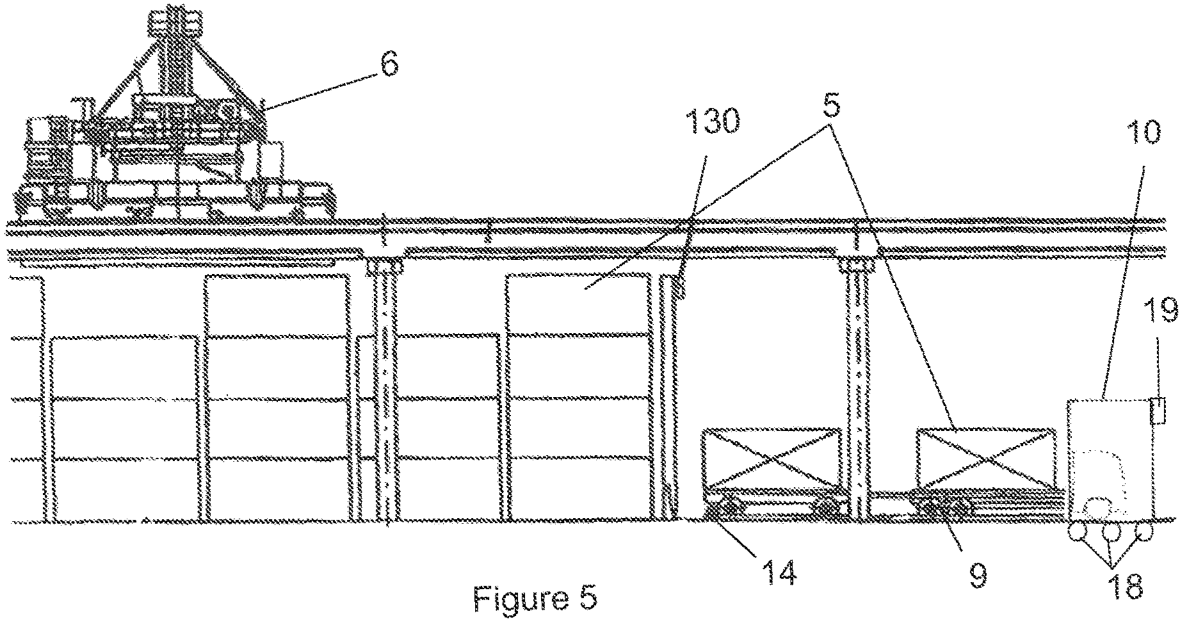
FIG. 5 shows a side view of the area with the protective structure according to an embodiment.
Figure 6:
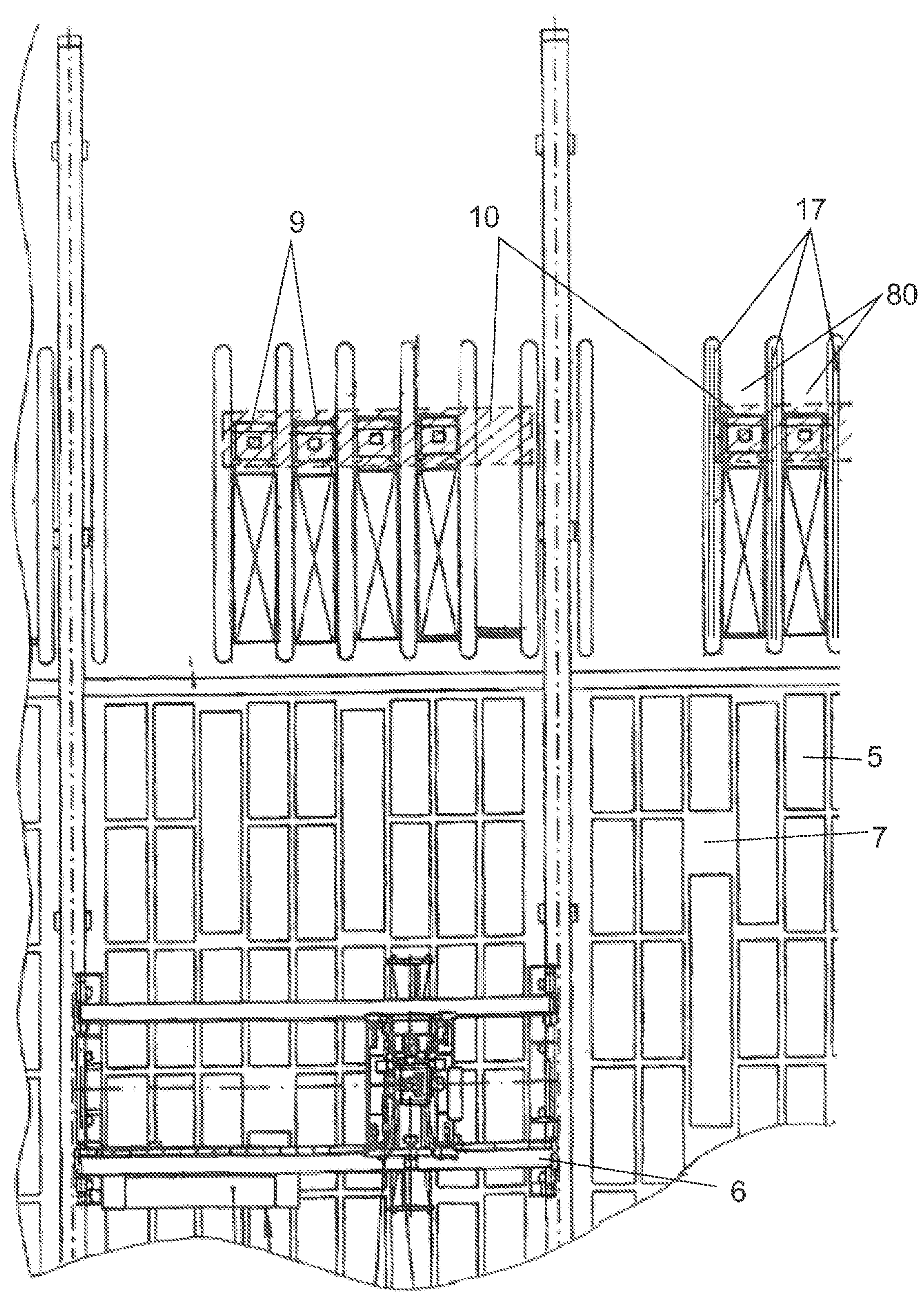
FIG. 6 shows a top view of the area with the protective structure according to an embodiment.

FIG. 4 shows a top view of the protective structure 10. FIG. 5 shows a side view of the container yard 7 and loading/unloading zone 8 area with the protective structure 10 according to an embodiment. FIG. 6 shows a top view of the container yard 7 and loading/unloading zone 8 area with the protective structure 10 according to an embodiment.

The protective structure 10 is configured to cover (illustrated as striped region) a larger section than a cabin area of the transport vehicle 9. For example, atypical truck's cabin dimension is 2.6 metres wide and 2.3 metres long. Therefore, the protective structure 10 should cover a larger section than 2.6 metres times 2.3 metres. In practice, due to the transport vehicle's 9 movement to and from the loading/unloading zone 8, wider cover is preferred, for example as wide as the parking lane 80, such as up to 4 metres. The length of the protective structure 10 can also be up to 4 metres so that fuel tanks and sleeper-cab are also protected under the top 12. For the terminal tractor, the dimensions are smaller compared to the truck. For example, a typical terminal tractor's cabin dimension is 2.2 metres wide and 1.6 metres long. Therefore, the protective structure 10 for terminal tractors can be designed to cover a larger section than 2.2 metres times 1.6 metres. The length of the protective structure 10 can be a standard for the loading/unloading zone 8 as the excess length remains in front of the cabin due to the transport vehicles 9 reversing and driving through the protective structure 10.

The protective structure 10 should be dimensioned so that the sides 11 and top 12 do not constrain movement of the transport vehicle 9 nor loading/unloading of the container 5. The transport vehicle 9 can reverse into and drive from the loading/unloading zone 8 loaded with the container 5 without touching the protective structure 10. In some embodiments, the width of the top 12 can cover more than one parking lane 80 and having support columns between the parking lanes 80. For example, it can be constructed to cover all the parking lanes 80 of the 30 loading/unloading zone 8 located under the container crane 6.

In some embodiments, the loading/unloading zone 8 can further comprise a wheel stopper 14 for indicating a correct place for the transport vehicle 9 to stop and preventing the transport vehicle 9 to move over it. Such wheel stopper 14 can be made of rubber or concrete blocks, for example. It helps the driver to park the transport vehicle 9 at the correct place for the optimal loading/unloading operation.

In case of protective structures 10 fixed to the ground, a distance between the wheel stopper 14 and the protective structure 10 can be tailored to the transport vehicles 9 having a substantial same length measured from the rear wheels to the cabin. This usually applies to terminal tractors operating only within the port area. One of the advantages of these protective structures is high strength to withstand the movement of the container 5.

However, some transport vehicles 9 have different lengths. For instance, FIG. 5 shows a transport vehicle configured to transport two containers at the same time. In those cases, parking lanes 80 can be grouped with adjacent lanes, so that the protective structure 10 can be arranged in parallel in the same place with respect to the length of each parking lane 80. For instance, a group of 4-5 lanes for 16 metres long trucks, and a group of 2-3 lanes for 12 metres long trucks. In this arrangement, the container crane 6 can utilize transport vehicles of different lengths.

If the system wants to utilize more than 2-3 truck length variations, the protective structure 10 can be made movable from the ground and longitudinally relocatable. If the protective structure 10 is on a wrong location, they can be moved to the correct location. Alternatively, if the driver has parked to a wrong parking lane 80 where the protective structure 10 is not adjusted to the correct location, the protective structure 10 can be moved to the correct location.

Moving and relocating can be done manually or automatically. When done automatically, the protective structure 10 can comprise means, such as sensors or monitors, for identifying the cabin's longitudinal position and moves the protective structure to the correct location. Moving can be done via rails 17, or wheels 18, or lifting, for example.

The manual relocation can be by towing or pushing using a vehicle, and the protective structure 10 can be locked in place, for example by rail locks. There can be a scale in the vicinity of the rail for each vehicle length. Such manual relocation can be implemented when the relocation happens rarely. However, when there are several parking lanes 80 in parallel, the desired lengths can be formed from them. The number of parking lanes 80 for each reserved length can be designated to future vehicle lengths in that period.

In some embodiments, the protective structure 10 can further comprise a built-in transmission motor, which can be connected to wheels under the protective structure 10. The protective structure 10 can be guided from controls in the protective structure 10 to the desired position. Control can also be done by the remote crane operator, while at the same time a warning can be given about the remotely controlled movement around the protective structure 10.

A sign or display 19 can be provided in the vicinity of the front of each parking lane 80 for indicating the correct vehicle length for each assigned protective structure 10. The display 19 can alternatively be attached to the front edge of the protective structure 10. The display 19 can show the truck type suitable for the assigned parking lane 80 and the protective structure 10 in which case the driver can choose the correct parking lane 80.

Figure 7:
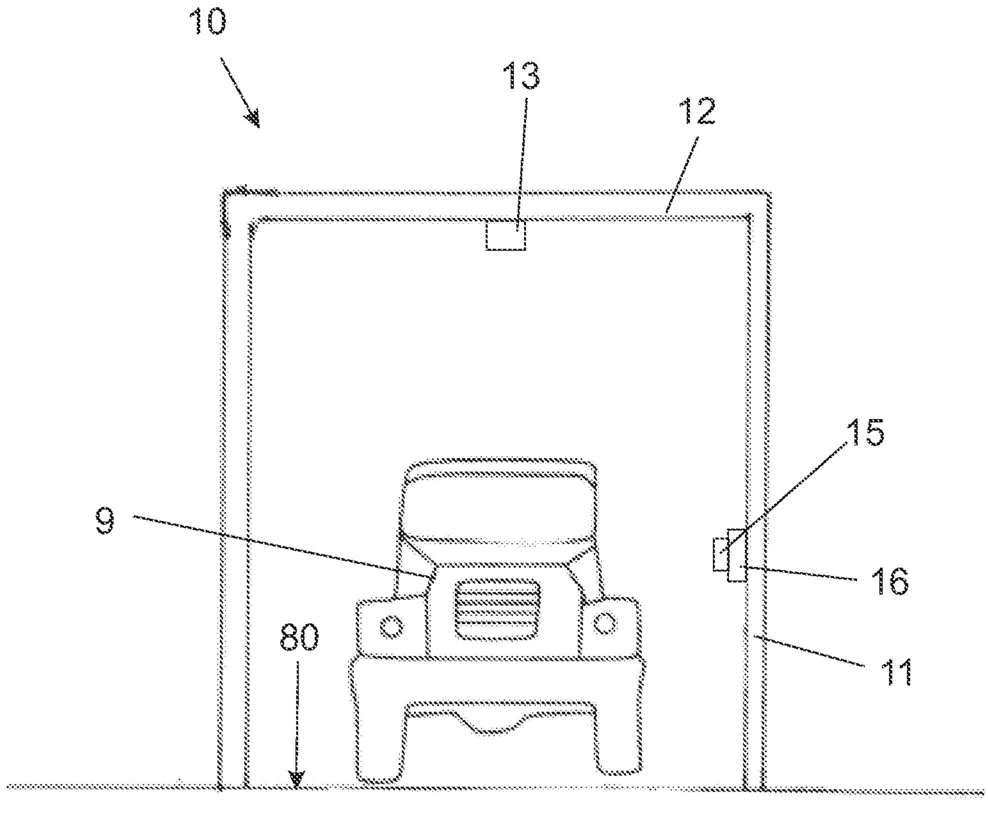
FIG. 7 shows a front view of a protective structure according to another embodiment.

FIG. 7 shows a front view of a protective structure 10 according to another embodiment, wherein the protective structure 10 can further comprise a sensor 13 configured to detect movement of the predetermined section. The sensor 13 can be a motion sensor, such as a passive infrared (PIR) sensor, microwave sensor, ultrasonic sensor, 2D or 3D laser scanner (LIDAR) or video camera software, for example.

Particularly in LIDAR, laser light is emitted by the laser scanner at the scanner's spread angle, which may be for example 180 degrees. The spread angle determines the width of the laser scanner fan. The range of the laser scanner is typically more than 20 m, but the range may also be more than 100 m, depending on the laser scanner model. The laser light emitted by the LIDAR is reflected from objects in the direction of emission, whereby the distance to the objects can be determined on the basis of the emitted and reflected beam of light, for instance by determining the propagation time of the laser beam. Laser beams are emitted as a fan, the measurement directions of which are determined by means of degrees. The LIDAR thus gives the distance to an object positioned in the emission direction per each emission direction of a laser beam.

The sensor 13 can be attached to an underside of the top 12 or to the inner surface of the side 11. Particularly, the sensor 13 can be attached to the middle of the underside of the top 12 behind the cabin area so that whole section covered by the protective structure 10 can be observed with a single sensor 13. In some embodiments, one sensor 13 can be attached to each side 11 of the protective structure for a better coverage.

The sensor 13 is configured to detect movement within the protected section and to send signals, wirelessly or with a wire, to a controller, which can be for example a terminal operating system (TOS). The sensor 13 can also be configured to observe loading/unloading of the container 5 behind the cabin of the transport vehicle 9. The sensor 13 can also be configured to detect the correct detachment of the container 5 from a platform of the transport vehicle 9 so that the detachment is safe. If for any reason the container 5 is stuck to the platform and lifting is also noted as the platform and/or the vehicle rising, the lifting will be stopped.

FIG. 5 shows an additional sensor 130 mounted on a column behind the transport vehicle 9. The column can be for example one of the columns for supporting the container crane 6. The additional sensor 130 can be configured to observe loading/unloading of the container 5 behind the cabin of the transport vehicle 9, and to observe the correct location in relation to the wheel stopper 14.

The sensor 13 or/and the additional sensor 130 can be configured to check the correct position of the protective structure 10 in relation to the cabin. If the protective structure 10 is movable, the protective structure 10 can be moved to a position corresponding to the cabin based on the measurements of the sensors 13, 130 and by means of the transmission motor or motors.

The sensor 13 and the additional sensor 130 together can further be configured to monitor the loading situation i.e. lowering and lifting of the container 5. During the lowering, the sensors 13, 130 can be configured to detect corner locks 20 of the transport vehicle 9 and based on the locations of the corner locks 20, the container crane 6 can be controlled to lower the container 5 onto the corner locks 20.

The TOS is configured to control and supervise all the loading/unloading operations of the container crane 6 in the container yard 7, such as keeping records of all the containers 5 passed through the port and communicating with the container cranes 6.

The TOS can be configured to stop all operations of the ongoing loading/unloading of the current container crane 6 if the sensor 13 detects motion under the protective structure 10. The motion can be for example, opening driver's door, another port worker passing through, movement of transport vehicle, etc. The TOS can be configured to resume the operations after a pre-set time has passed from the detection.

The TOS can also be configured to alarm the remote crane operator with visual displays, such as camera feed, or/and sound alarms if such detection is observed. The remote crane operator may assess the situation and decide follow-up actions accordingly.

The cargo handling system can further comprise an emergency stop switch 15 communicatively connected to the TOS for stopping all crane operations when activated. The emergency stop switch 15 can be a physical push button mounted on the side 11 of the protective structure 10 or an emergency cable hanging from the underside of the top 12. The emergency stop switch 15 should be reachable to the driver sitting inside the cabin. In another embodiment, the emergency stop switch 15 can be integrated within a vehicle-mounted terminal (VMT) device, which can be readily mounted inside the cabin of the transport vehicle 9 or received by the driver when entering the container terminal area 1 at the identification zone 4. The VMT device is configured to be communicatively connected with the container crane 6. The container crane 6 can have its own operating system, allowing it to operate as a separate entity, but could also communicate with the TOS and under the TOS. Therefore, the VMT device can also be communicatively connected to the TOS via the container crane 6.

In some embodiments, the system further comprises an indicator 16, such as a signal light from a light source attached on the protective structure 10 or a sign on the VMT, which turns on or flashes, when the emergency stop swich has been activated or the sensor 13 has detected movement.

The indicator 16 indicates to the driver that all crane operations have been halted and the driver should wait for further instructions from the remote crane operator.

The present invention provides a protective structure 10 for the drivers of the transport vehicle 9 so they can stay inside the cabin during loading and unloading process. If the lifted container 5 falls from the spreader of the container crane 6 or if a rope of the container crane 6 fails, the protective structure 10 prevents the container 5 to hit or fall on the cabin where the driver is waiting.

The present invention renders safety zones outside the loading/unloading zone 8 redundant because the drivers no longer need to exit the cabin and walk to the safety zone and back, which shortens the turnaround time of loading/unloading process and makes the container handling system a highly automated process. This also reduces remote crane operator's workload as they no longer need to make sure that the drivers have exited the cabin and loading/unloading zone 8 and thus receive less alerts relating to safety issues.

The invention claimed is:

1. A container handling system, comprising:

a container yard and a loading/unloading zone, an automated stacking crane or a rubber tyred gantry crane configured to move a container between the container yard and the loading/unloading zone, the loading/unloading zone is configured to receive a transport vehicle for transporting the container, the loading/unloading zone further comprises a wheel stopper for indicating a correct place for the transport vehicle, and a protective structure configured to cover a predetermined section of the loading/unloading zone, the wheel stopper being positioned at a predetermined longitudinal distance from the protective structure, wherein the protective structure comprises a sensor configured to detect movement within the predetermined section and to send signals to a controller, the sensor is attached to an underside of the protective structure, and the sensor or an additional sensor is configured to check correct position of the protective structure in relation to a cabin of the transport vehicle, wherein the controller is configured to stop all operations of the container crane in response to the sensor detecting motion under the protective structure, wherein the predetermined longitudinal distance is configured to align the protective structure over a cabin of the transport vehicle, and wherein the controller is configured to stop a movement of the automated stacking crane or the rubber tyred gantry crane in response to a signal from the sensor indicating an abnormal detachment state of a container from a platform of the transport vehicle.

2. The container handling system according to claim 1, wherein the protective structure is configured to cover a larger section than a cabin area of the transport vehicle.

3. The container handling system according to claim 1, wherein the loading/unloading zone comprises a plurality of parking lanes and the protective structure is configured to cover the section having a width of one parking lane of the plurality of parking lanes.

4. The container handling system according to claim 1, wherein the protective structure is fixed to a ground.

5. The container handling system according to claim 1, wherein the protective structure comprises two sides and supporting a top, wherein the transport vehicle can pass between the two sides and under the top.

6. The container handling system according to claim 5, wherein the top comprises a roof made of a metal plate and metal grids or reinforcements.

7. The container handling system according to claim 6, wherein the roof is at least partially inclined.

8. The container handling system according to claim 7, wherein a slope of the roof varies from 1-15 degrees, and particularly 1-10 degrees.

9. The container handling system according to claim 7, wherein the roof is configured to guide rainwater towards a longitudinal border of the parking lane.

10. The container handling system according to claim 5, wherein the side comprises a pillar or/and a wall.

11. The container handling system according to claim 1, wherein the sensor is a 2D or 3D laser scanner.

12. The container handling system according to claim 1, wherein the loading/unloading zone further comprises a wheel stopper for indicating a correct place for the transport vehicle to stop.

13. The container handling system according to claim 1, wherein the container handling system further comprises an emergency stop switch for stopping all crane operation when activated.

14. The container handling system according to claim 2, wherein the loading/unloading zone comprises a plurality of parking lanes and the protective structure is configured to cover the section having a width of one parking lane of the plurality of parking lanes.

15. The container handling system according to claim 2, wherein the protective structure is fixed to a ground.

16. The container handling system according to claim 3, wherein the protective structure is fixed to a ground.

17. The container handling system according to claim 2, wherein the protective structure comprises two sides and supporting a top, wherein the transport vehicle can pass between the two sides and under the top.

18. The container handling system according to claim 3, wherein the protective structure comprises two sides and supporting a top, wherein the transport vehicle can pass between the two sides and under the top.

19. A container handling system, comprising:

a container yard and a loading/unloading zone, an automated stacking crane or a rubber tyred gantry crane configured to move a container between the container yard and the loading/unloading zone, the loading/unloading zone is configured to receive a transport vehicle for transporting the container, the loading/unloading zone further comprises a protective structure configured to cover a predetermined section of the loading/unloading zone, wherein the protective structure comprises a sensor configured to detect movement within the predetermined section and to send signals to a controller, the sensor is attached to an underside of the protective structure, and the sensor or an additional sensor is configured to check correct position of the protective structure in relation to a cabin of the transport vehicle, wherein the protective structure is movable and longitudinally relocatable to adjust for transport vehicles of varying lengths, and the signals are sent to the controller configured to stop all operations of the container crane in response to the sensor detecting motion under the protective structure.

* * * * *